United States Patent
Ducharme et al.

(10) Patent No.: US 7,120,253 B2
(45) Date of Patent: Oct. 10, 2006

(54) METHOD AND SYSTEM FOR PROTECTING VIDEO DATA

(75) Inventors: Paul Ducharme, Scarborough (CA); Steven Eng, Markham (CA)

(73) Assignee: VIXS Systems, Inc., Toronto, Ontario (CA)

(*) Notice: Subject to any disclaimer, the term of this patent is extended or adjusted under 35 U.S.C. 154(b) by 877 days.

(21) Appl. No.: 10/137,151

(22) Filed: May 2, 2002

(65) Prior Publication Data

US 2003/0206636 A1    Nov. 6, 2003

(51) Int. Cl.
*H04L 9/00* (2006.01)
*H04N 7/167* (2006.01)
*H04N 7/173* (2006.01)

(52) U.S. Cl. .......................... 380/211; 713/153; 725/31; 725/71

(58) Field of Classification Search ................ 380/211; 713/153; 725/31, 71
See application file for complete search history.

(56) References Cited

U.S. PATENT DOCUMENTS

| | | | |
|---|---|---|---|
| 4,866,395 A | 9/1989 | Hostetler | 329/309 |
| 5,027,203 A | 6/1991 | Samad et al. | 348/441 |
| 5,093,847 A | 3/1992 | Cheng | 375/344 |
| 5,115,812 A | 5/1992 | Sano et al. | 600/419 |
| 5,253,056 A | 10/1993 | Puri | 375/240.01 |
| 5,475,434 A | 12/1995 | Kim | 375/240.24 |
| 5,563,950 A | 10/1996 | Easter et al. | 713/191 |
| 5,602,589 A | 2/1997 | Vishwanath et al. | 375/240.11 |
| 5,635,985 A | 6/1997 | Boyce et al. | 375/240.15 |
| 5,644,361 A | 7/1997 | Ran et al. | 375/240.16 |
| 5,652,749 A | 7/1997 | Davenport et al. | 370/466 |
| 5,732,391 A | 3/1998 | Fiocca | 704/229 |
| 5,737,020 A | 4/1998 | Hall et al. | 375/240.2 |
| 5,740,028 A | 4/1998 | Sugiyama et al. | 725/149 |
| 5,844,545 A | 12/1998 | Suzuki et al. | 345/146 |
| 5,850,443 A | 12/1998 | Van Oorschot et al. | 380/285 |
| 5,937,067 A * | 8/1999 | Thatcher et al. | 380/212 |
| 5,940,130 A | 8/1999 | Nilsson et al. | 375/240.12 |
| 5,996,029 A | 11/1999 | Sugiyama et al. | 710/15 |
| 6,005,623 A | 12/1999 | Takahashi et al. | 375/240.16 |
| 6,005,624 A | 12/1999 | Vainsencher | 375/240.14 |
| 6,014,694 A | 1/2000 | Aharoni et al. | 709/219 |
| 6,040,863 A | 3/2000 | Kato | 375/240.16 |
| 6,081,295 A | 6/2000 | Adolph et al. | 375/240.03 |
| 6,141,693 A | 10/2000 | Perlman et al. | 709/236 |
| 6,144,402 A | 11/2000 | Norsworthy et al. | 725/109 |
| 6,167,084 A | 12/2000 | Wang et al. | 375/240.2 |
| 6,182,203 B1 | 1/2001 | Simar, Jr. et al. | 712/22 |

(Continued)

FOREIGN PATENT DOCUMENTS

EP    0661826 A2    7/1995

(Continued)

OTHER PUBLICATIONS

Pedro Assuncao and Mohammad Ghanbari, "Rate Reduction Techniques for MPEG-2 Video Bit Streams," SPIE vol. 2952, Apr. 1996, 10 pp.

(Continued)

*Primary Examiner*—Jacques Louis-Jacques
*Assistant Examiner*—Matthew Heneghan

(57) ABSTRACT

A key protected data stream and an encryption key are received at a gateway device. The gateway devices unprotects the data stream based upon the encryption key. The unprotected received data is modified by the gateway to generate a modified data. The modified data is protected based upon the encryption key to generate a key protected modified data. The gateway then transmits the key protected modified data to one or more clients along with the encryption key.

11 Claims, 4 Drawing Sheets

U.S. PATENT DOCUMENTS

| | | | |
|---|---|---|---|
| 6,195,368 B1* | 2/2001 | Gratacap | 370/535 |
| 6,215,821 B1 | 4/2001 | Chen | 375/240.05 |
| 6,219,358 B1 | 4/2001 | Pinder et al. | 370/537 |
| 6,222,886 B1 | 4/2001 | Yogeshwar | |
| 6,236,683 B1 | 5/2001 | Mougeat et al. | 375/240.16 |
| 6,259,741 B1 | 7/2001 | Chen et al. | 375/240.26 |
| 6,263,022 B1 | 7/2001 | Chen et al. | 375/240.03 |
| 6,300,973 B1 | 10/2001 | Feder et al. | 348/14.09 |
| 6,307,939 B1 | 10/2001 | Vigarie | 380/210 |
| 6,314,138 B1 | 11/2001 | Lemaguet | 375/240 |
| 6,323,904 B1 | 11/2001 | Knee | 348/425.1 |
| 6,366,614 B1 | 4/2002 | Pian et al. | 375/240.2 |
| 6,385,248 B1 | 5/2002 | Pearlstein et al. | 375/240.25 |
| 6,438,168 B1 | 8/2002 | Arye | 375/240.03 |
| 6,480,541 B1 | 11/2002 | Girod et al. | 375/240.12 |
| 6,526,099 B1 | 2/2003 | Chistopoulos et al. | 375/240.26 |
| 6,549,561 B1 | 4/2003 | Crawford | 375/137 |
| 6,584,509 B1 | 6/2003 | Putzolu | 709/240 |
| 6,714,202 B1 | 3/2004 | Dorrell | 345/474 |
| 6,724,726 B1 | 4/2004 | Coudreuse | 370/235 |
| 6,748,020 B1 | 6/2004 | Eifrig et al. | 375/240.26 |
| 6,771,657 B1* | 8/2004 | Elstermann | 370/465 |
| 2001/0026591 A1 | 10/2001 | Keren et al. | 375/240.26 |
| 2002/0106022 A1 | 8/2002 | Takahashi et al. | 375/240.03 |
| 2002/0110193 A1 | 8/2002 | Kyoon et al. | 375/240.02 |
| 2002/0138259 A1 | 9/2002 | Kawahara | 704/229 |
| 2002/0145931 A1 | 10/2002 | Pitts | 365/225.7 |
| 2002/0163911 A1* | 11/2002 | Wee et al. | 370/389 |
| 2002/0196851 A1 | 12/2002 | Arnaud | 375/240.12 |
| 2003/0093661 A1 | 5/2003 | Loh et al. | 713/2 |
| 2003/0152148 A1 | 8/2003 | Laksono | 375/240.24 |

FOREIGN PATENT DOCUMENTS

| | | |
|---|---|---|
| EP | 0739138 A2 | 10/1996 |
| EP | 0805599 A2 | 11/1997 |
| EP | 0855805 A2 | 7/1998 |
| EP | 0896300 B1 | 2/1999 |
| EP | 0901285 A1 | 2/1999 |
| EP | 0955607 A2 | 11/1999 |
| EP | 1032214 A2 | 8/2000 |
| JP | 07-210670 A | 8/1995 |
| WO | WO 01/95633 A2 | 12/2001 |
| WO | WO 02/080518 A2 | 10/2002 |

OTHER PUBLICATIONS

Jae-Young Pyun, "QoS Provisioning for Video Streaming over IEEE 802.11 Wireless LAN," (abridged) IEEE Conference in Consumer Electronics, Jun. 16, 2003, 3 pp. [online] Retrieved from the Internet Jul. 8, 2003 at URL.

Krisda Lengwehasatit and Antonio Ortega, "Computationally Scalable Partial Distance Based Fast Search Motion Estimation," Univ. of Southern California, 4 pp., (date unknown).

Manoj Aggarwal and Ajai Narayan, "Efficient Huffman Decoding," 2000 IEEE, 0-7803-6297-7, pp. 936-939.

Peng Yin et al., "Video Transcoding by Reducing Spatial Resolution," Princeton University, Princeton, NJ, 4 pp., 2000.

Zhigang Fan and Ricardo de Queiroz, "Maximum Likelihood Estimation of JPEG Quantization Table in the Identification of Bitmap Compression History," Xerox Corporation, Webster, NY, 4 pp. (date unknown).

Luis Ducla Soares et al., "Influence of Encoder Parameters on the Decoded Video Quality for MPEG-4 Over W-CDMA Mobile Networks," NTT DoCoMo, Inc. technical paper, 4 pp. (date unknown).

Thomas Wiegand et al., "Long-Term Memory Motion-Compensated Prediction for Rubust Video Transmission," in Proc. ICIP2000, 4 pp.

P. Greg Sherwood et al., "Efficient Image and Channel Coding for Wireless Packet Networks," Univ. of CA, San Diego, CA, Dept. of ECE; 4 pp. (date unknown).

Donghoon Yu et al., "Fast Motion Estimation for Shape Coding in MPEG-4," 2003 IEEE Transactions on Circuits and Systems for Video Technology, vol. 13, No. 4, Apr. 2003, pp. 358-363.

Tamer Shanableh and Mohammed Ghanbari, "Heterogeneous Video Transcoding to Lower Spatio-Temporal Resolutions and Different Encoding Formats," IEEE Transactions on Multimedia, vol. 2, No. 2, pp. 101-110, Jun. 2000.

Jeongnam Youn et al., "Video Transcoding for Multiple Clients," Proceedings of the SPIE, Bellingham, VA, vol. 4067, XP008012075, pp. 76-85, Jun. 21, 2000.

Kuniaki Takahashi et al., "Motion Vector Synthesis Algorithm for MPEG2-to-MPEG4 Transcoder," Proceedings of the SPIE, Bellingham, VA, vol. 4310, XP008000078, pp. 387-882, Jan. 24, 2000.

Yu, Donghoom, et al., "Fast Motion Estimation for Shape Coding in MPEG-4," IEEE Transactions on Circuits and Systems for Video Technology, vol. 13, No. 4, 2003 IEEE, Apr. 2003, pp. 358-363.

Pyun, Jae-Young, "QoS Provisioning for Video Streaming Over IEEE 802.11 Wireless LAN," (abridged) IEEE Conferences in Consumer Electronics, Jun. 16, 2003, EE Times, Seoul, Korea, <http://eetimes.com/printableArticle?doc_id=OEG2003061S0070> retrieved Jul. 8, 2003.

Youn, Jeongnam et al., "Video Transcoding For Multiple Clients," Proceedings of the SPIE, Bellingham, VA, vol. 4067, XP008012075, pp. 76-85, University of Washington, Sealttle, WA.

Lengwehasatit, Krisda et al., "Computationally Scalable Partial Distance Based Fast Search Motion Estimation," Packet Video Corp., San Diego, California.

Takahashi, Kuniaki, et al., "Motion Vector Synthesis Algorithm for MPEG2-to-MPEG4 Transcoder," Proceedings of the SPIE, Bellingham, VA, vol. 4310, Sony Corporation, XP008000078, pp. 387-882, 2001 SPIE.

Soares, Luis Ducla, et al., "Influence of Encoder Parameters on the Decoded Video Quality for MPEG-4 Over W-CDMA Mobile Networks," NTT DoCoMo, Inc.

Aggarwal, Manoj et al., "Efficient Huffman Decoding," 2000 IEEE, 0-7803-6297-7, pp. 936-939, University of Illinois at Urbana-Champaign, Urbana, IL.

Sherwood, P. Greg et al., "Efficient Image and Channel Coding for Wireless Packet Networks," University of California, La Jolla, California.

Assuncao, Pedro et al., "Rate Reduction Techniques for MPEG-2 Video Bit Streams," SPIE, vol. 2952, Apr. 1996, pp. 450-459, University of Essex, Colchester, England.

Yin, Peng et al., "Video Transcoding by Reducing Spatial Resolution," Princeton University, 2000, Princeton, New Jersey.

Shanableh, Tamer et al., "Heterogeneous Video Transcoding to Lower Spatio-Temporal Resolutions and Difference Encoding Formats," IEEE Transactions on Multimedia, vol. 2, No. 2, Jun. 2000, pp. 101-110, Engineering and Physical Sciences Researc Counsel, Colchester, U.K.

Wiegand, Thomas et al., "Long-Term Memory Motion-Compensated Prediction for Rubust Video Transmittion," in Proc. ICIP 2000, University of Erlangen-Buremberg, Erlangen, Germany.

Fan, Zhigang et al. "Maximum Likelihood Estimation of JPEG Quantization Table in the Identification of Bitmap Compression History," Xerox Corporation, Webster, New York.

Thomas, Shine M. et al., "An Efficient Implentation of MPEG-2 (BC1) Layer 1 & Layer 2 Stereo Encoder on Pentium-III Platform", pp. 1-10, Sasken Communication Technologies Limited, Bangalore, India.

Ramanujan, Ranga S. et al., "Adaptive Streaming of MPEG Video Over IP Networks," 22nd IEEE Conference on Local Computer Networks (LCN '97), Nov. 2-5, 1997, 1997 IEEE, pp. 398-409, Architecture Technology Corporation, Minneapolis, MN.

Rejaie, Reza et al., "Architectural Considerations for Playback of Quality Adaptive Video Over the Internet," XP002177090, 2000 IEEE pp. 204-209, AT&T Labs, Menlo Park, California.

Bouras, C. et al., "On-Demand Hypermedia/Multimedia Service Over Broadband Networks," XP-002180545, 1996 IEEE Proceedings of HPDC-5 '96, pp. 224-230, University of Patras, Patras, Greece.

Chalidabhongse, Junavit et al., "Fast Motion Vector Estimation Using Multiresolution-Spatio-Temporal Correlations," IEEE Transactions On Circuits and Systems For Video Technology, vol. 7, No. 3 Jun. 1997, pp. 477-488.

Oh, Hwang-Seok et al., "Block-Matching Algorithm Based On An Adaptive Reduction of the Search Area For Motion Estimation," Real-Time Imaging, Academic Press Ltd., Vol. 56, No. 5, Oct. 2000, pp. 407-414, XP004419498 ISSN: 1077-2014 , Taejon, Korea.

Lee, Liang-Wei et al., "Dynamic Search-Window Adjustment and Interlaced Search for Block-Matching Algorithm," IEEE Transactions On Circuits and Systems for Video Technology, IEEE, vol. 3, No. 1, Feb. 3, 1993, pp. 85-87, XP000334581 ISSN: 1051-8215, New York.

Fukunaga, Shigeru et al., "MPEG-4 Video Verification Model Version 16.0" International Organization for Standardization: Coding of Moving Pictures and Audio, vol. N3312, Mar. 2000, pp. 1-380, XP000861688.

Kroner, Sabine et al., "Edge Preserving Noise Smoothing With An Optimized Cubic Filter," DEEI, University of Trieste, Trieste, Italy.

Kim, Jaemin et al., "Spatiotemporal Adaptive 3-D Kalman Filter for Video," pp. 1-12. Samsung Semiconductor, Inc. San Jose, Calfiornia.

Liu, Julia J., "ECE497KJ Course Project: Applications of Wiener Filtering In Image and Video De-Noising," pp. 1-15, May 21, 1997.

Jostschulte, K. et al., "A Subband Based Spatio-Temporal Noise Reduction Technique for Interlaced Video Signals," University Dortmund, Dortmund, Germany.

Kossentini, Faouzi et al. "Predictive RD Optimized Motion Estimation for Very Low Bit-Rate Video Coding," 1997 IEEE, XP-000726013, pp. 1752-1963, Sep. 1, 1996, 1997 International Conference on Image Processing, Vancouver, Canada.

Tourapis, Alexis et al. "New Results on Zonal Based Motion Estimation Algorithms—Advanced Predictive Diamond Zonal Search," 2001 IEEE, pp. V 183-V 186, The Hong Kong University of Science and Technology, Clear Water Bay, Kowloon, Hong Kong.

Brandenburg. Karlheinz, "MP3 and AAC Explained," Proceedings of AES 17th International Conference, XP008004053, pp. 99-110, Erlangen, Germany.

Painter, Ted et al., "Perceptual Coding of Digital Audio," Proceedings of the IEEE, vol. 88, No. 4, Apr. 2000, pp. 451-513, XP001143231, ISSN: 0018-9219, Arizona State University, Tempe, AZ.

Hassanzadegan, Hooman et al., "A New Method for Clock Recovery in MPEG Decoders," pp. 1-8, Basamad Negar Company, Tehran, Iran.

Kan, Kou-Sou et al., "Low-Complexity and Low-Delay Video Transcoding for Compressed MPEG-2 Bitstream," Natinal Central University, Chung-Li, Taiwan.

Mitchell et al., "MPEG Video Compression Standard: 15.2 Encoder and Decoder Buffering," Chapman and Hall Digital Multimedia Standards Series, pp. 340-356, XP002115299, ISBN: 0-412-08771-5, Chapman and Hall, New York.

Whybray, M.W. et al., "Video Coding—Techniques, Standards and Applications," BT Technol J. vol. 14, No. 4, Oct. 4, 1997, pp. 86-100, XP000722036.

"Sharp Product Information: VTST-Series NTSC/PAL Electronic Television Tuners," RF Components Group, Sharp Microelectronics of the America, 1997.

Edwards, Larry M., "Satisfying Your Need for Net Speed," San Diego Metropolitan, Sep. 1999, <<www. sandiegometro.com/1999/sept/speed.html>>, retrieved on Jul. 19, 2001.

Oz, Ran et al., "Unified Headend Technical Management of Digital Services," BigBend Networks, Inc.

Muriel, Chris, "What is Digital Satellite Television?," What is Digital Television Rev. 3.0, Apr. 21, 1999, SatCure, Sandbach, England, <<http://www.netcentral.co.uk/satcure/digifaq.htm>>, access on Apr. 20, 2001.

"Conexant Products & Tech Info: Product Briefs: CX24108," 2000-2002 Conexant Systems, Inc. access on Apr. 20, 2001.

"Conexant Products & Tech Info: Product Briefs: CX22702," 2000-2002 Conexant Systems, Inc. access on Apr. 20, 2001.

"TDC: Components for Modems & Digital Infotainment: Direct Broadcast Satellite Chipset," 2001 Telecom Design Communications Ltd., U.K., <<http://www.tdc.co.uk/modmulti/settop/index.htm>>, access on Apr. 20, 2001.

"White Paper: Super G: Maximizing Wireless Performance," Mar. 2004, Atheros Communications, Inc., pp. 1-20, Document No. 991-00006-001, Sunnyvale, California.

Kwok, Y.K. et al., "Efficient Multiple Access Control Using a Channel-Adaptive Protocol for a Wireless ATM-Based Multimedia Services Network," Mar. 29, 2000, Computer Communications 24(2001) 970-983, University of Hong Kong, Hong Kong, PRC.

Liang, Ying-Chang et al., "Joint Downlink Beamforming, Power Control, and Data Rate Allocation for DS-CDMA Mobile Radio with Multimedia Services," 2000 IEEE, pp. 1455-1457, Ceneter for Wireless Communication, Singapore.

Razavi, Behzad, "Challenges in Portable RF Transceiver Design," Sep. 1996, 1996 IEEE, pp. 12-25, Circuits & Devices.

Mannion, Patrick, "IceFyre Device Cools 802.11a Power Consumption," Sep. 24, 2001, Planet Analog, National Semiconductor, <<http://www.planetanalog.com/story/OEG20010924S0079>>, access on Nov. 5, 2001.

"ICE Fyre Semiconductor: IceFyre 5-GHz OFDM Modem Solution," Sep. 2001, pp. 1-6, ICEFYRE: Rethink Wireless, IceFyre Semiconductor, Inc.

Pozar, David M., " Theory and Design of Ferrimagnetic Components," 1990, pp. 529, Microwave Engineering, Addison-Wesley Publishing Company, Inc.

"Part 11: Wireless LAN Medium Access Control (MAC) and Physical Layer (PHY) Specifications: High-Speed Physical Layer in the 5 GHz Band," 1999 IEEE, pp. 1-83, Supplement to IEEE Standard fo rInformation Technology, IEEE Std 802.11a-1999, LAN/MAN Standards Committee.

Ciciora, Walter S., "Cable Television in the United States: An Overview," May 25, 1995, pp. 1-90, Cable Television Laboratories, Inc., Louisville, Colorado.

* cited by examiner

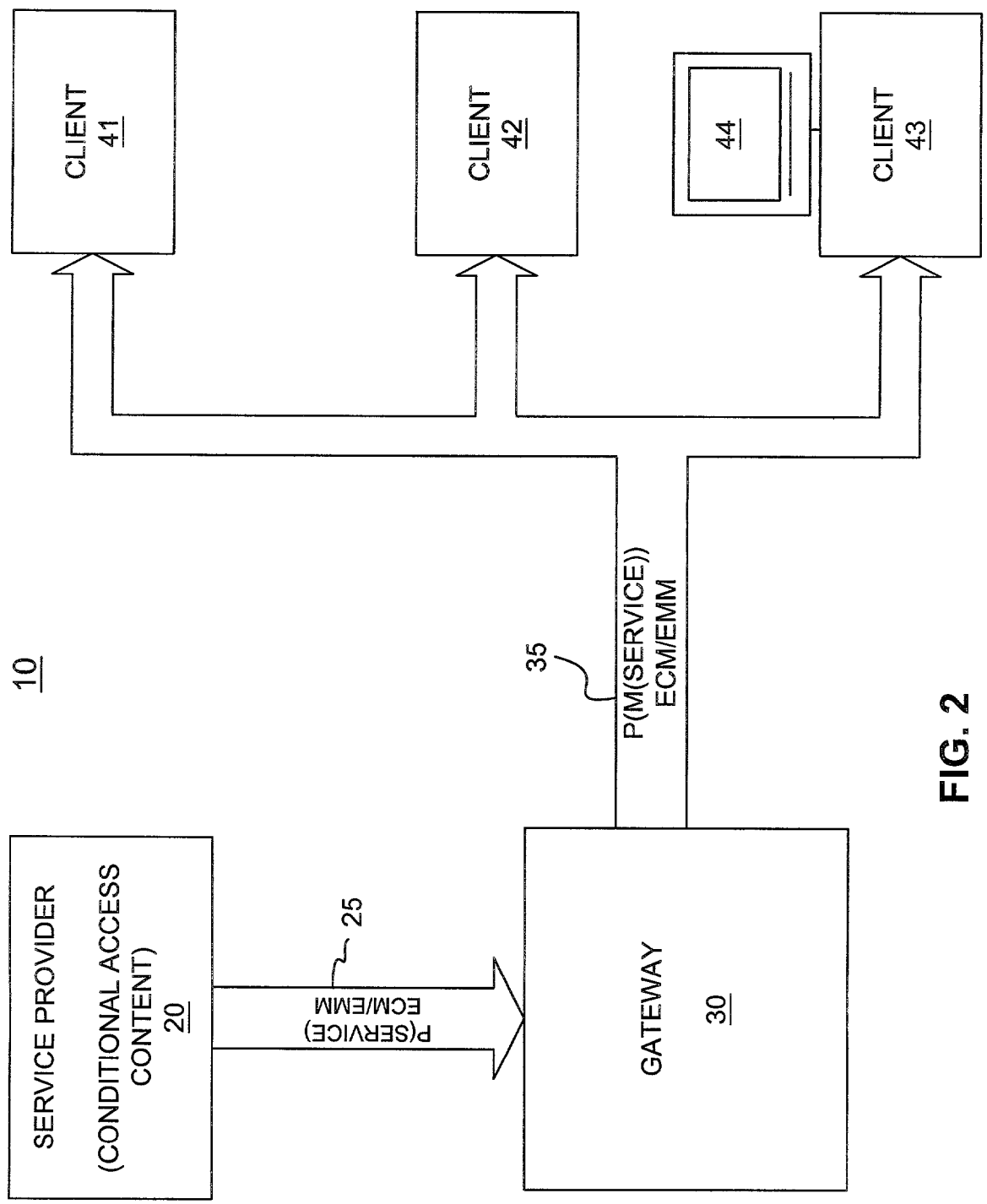

METHOD AND SYSTEM FOR PROTECTING VIDEO DATA

FIELD OF THE DISCLOSURE

Generally the present disclosure relates to protecting video data, and more particularly the present disclosure relates to protecting video data using encryption keys.

BACKGROUND

Data protection methods such as encryption and scrambling methods are commonly implemented in devices and systems to protect data from illicit access and/or tampering. For example, many providers of motion pictures experts group (MPEG) encoded multimedia content, also referred to as video content or data herein, use encryption and scrambling to prevent unauthorized accessing of the MPEG content before it is decoded. One type of data protection known in the communication industry includes the use of encryption keys to protect data, such as video data, from unauthorized access. For example, in the video industry, systems that need to transmit video content over publicly accessible medium are generally required by the video content owners to protect the video content through the use of one or more protection methods. One such method uses scrambling to protect video content by using control words that in turn are used to generate encryption keys that are used by a client device to regenerate the control words, thereby allowing subsequent descrambling of the video content. Such a protection requires considerable computing bandwidth and/or the management system required to generate the encryption keys, and/or the control words used to generate the encryption keys, as well as to perform the scrambling of the video.

Therefore, a method and or system that reduces the computing bandwidth to perform some or all of these functions would be beneficial.

BRIEF DESCRIPTION OF THE DRAWINGS

Various advantages, features and characteristics of the present disclosure, as well as methods, operation and functions of related elements of structure, and the combination of parts and economies of manufacture, will become apparent upon consideration of the following description and claims with reference to the accompanying drawings, all of which form a part of this specification.

FIG. 2 is a block diagram illustrating a system for reusing encryption keys in accordance with a specific embodiment of the disclosure;

DETAILED DESCRIPTION OF THE FIGURES

In accordance with the present disclosure, a system is described that receives an encryption key to unprotect key protected video data. The video data is then modified in some manner and re-scrambled based on the received encryption key data. The modified video data is then retransmitted to a client along with the original encryption key. The client receiving the original encryption keys can de-scramble the newly generated video by using the retransmitted key, which is the same as the original key. Processing time and bandwidth associated with determining the keys is eliminated by re-transmitting the original encryption keys to the clients for reuse. This is an advantage over known methods in that the saved bandwidth is available for other tasks, or alternatively, a processing device requiring less bandwidth can be used and allows the original service provider to extend entitlement control to the client even after the video has been altered. Specific embodiments of implementing the present invention are discussed with reference herein to FIGS. 1–6.

In the following discussion, the terms "protection", "encryption" and "scrambling", and their counterparts, i.e. "decryption" and "descrambling", are used to describe operations to render data unintelligible to an unauthorized entity. The term "protection", and its variations, is used broadly herein to reference any method used to render data unintelligible. The term "scrambling" generally refers to using relatively efficient algorithms that use orthogonal functions such as data shifts and/or XOR operations on large amounts of data. For example, data encryption standard (DES) scrambling is often used on video data. On the other hand, the term "encryption" generally refers to using relatively computationally intensive algorithms that use keys to render relatively small amounts of data unintelligible. One example of an encryption algorithm is the Rivest-Shamir-Adleman (RSA) algorithm. The techniques disclosed herein are applicable to various types of data, however, the specific embodiment described herein will be discussed primarily with reference to video data (video content).

Figure 1:
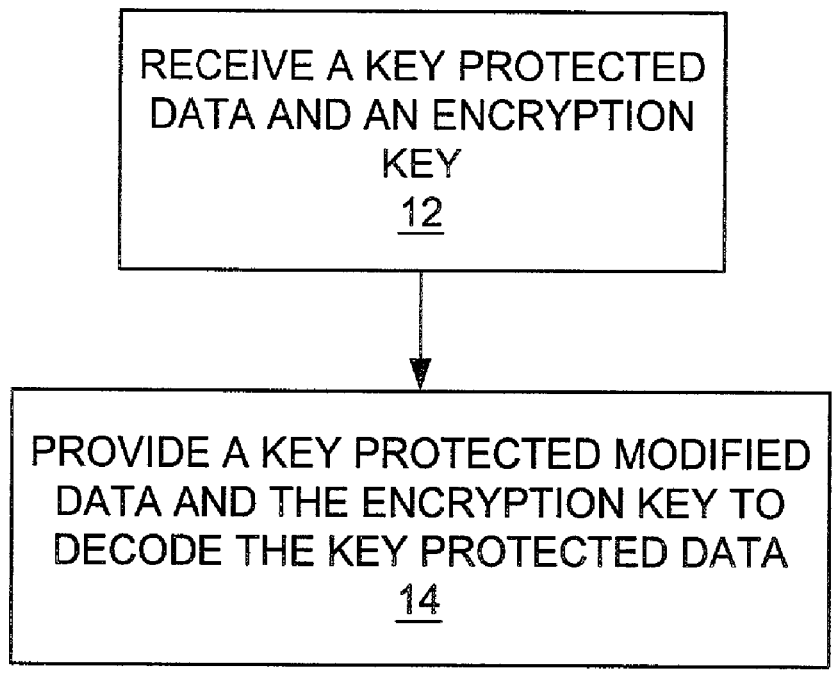
FIG. 1 is a flow diagram illustrating a method of reusing encryption keys in accordance with a specific embodiment of the present disclosure.

FIG. 1 illustrates a flow diagram representing a method in accordance with the present invention. At step 12, a key protected video data and an encryption key are received. In the specific embodiment illustrated in FIG. 2, the key protected video data and encryption key are received at the gateway 30 from the service provider 20 via connection 25. The key protected video data is represented by the nomenclature P(SERVICE), where SERVICE represent the unprotected video content, and P indicates that the SERVICE is key protected. The gateway is a device that receives data, can optionally modify it, and redistribute it to its own set of clients, one example of a gateway is a video gateway that can modify and redistribute video content.

The encryption key in FIG. 2 is included as part of the Entitlement Control Messages (ECM) and Entitlement Management Messages (EMM) indicators within connection 25. Specifically, the ECMs and EMMs are messages that adhere to specific protocols to provide the encryption key and other information used to enable the use of encryption keys. The principal use of an ECM is to deliver encryption keys, such as a DES (Data Encryption Standard) key, that will enable recovering (unprotecting) the video data (SERVICE) from its key protected state (P(SERVICE)). The principal use of an EMM is to distribute key management information to specific clients. One use of the key management information is to identify specific clients that are permitted to unprotect, thereby accessing, the SERVICE. Normally, a specific EMM contains information for a specific client, while the ECM contains key information used by all clients authorized by an EMM to access the SERVICE. For example, with respect to the system of FIG. 2, separate EMMs would generally be generated for each gateway 30 (only one shown) and each client 41–42.

Referring back to the method of FIG. 1, the key protected video data and encryption key information were received at step 12. At step 14, a key protected modified data, such as a modified video data, and the encryption key are provided. In FIG. 2, the key protected modified data and the encryption key are provided to clients 41–42 over connection 35, which represents either a common connection or a plurality of different connections to the clients 41–42. For example, the connection 35 can comprise one or more connections including fiber connections, wired connection, and wireless connections for transmitting data using various transmission protocols such as Ethernet, SONET Network, and others. The modified key protected video data is represented in FIG. 2 by the nomenclature P(M(SERVICE)), where M(SERVICE) is a modification of the received data (SERVICE), as indicated by the M designator. The P indicates that the modified data, M(SERVICE), is key protected based on the same encryption key as the encryption key received at step 12. When received at a video client, the protected modified video service can be unprotected using an encryption key, decoded and video images represented by the protected modified video service can be provided to a display device, such as device 44.

Processing time and/or hardware costs for the gateway are reduced by reusing the receive encryption key information. By reusing some or all of the received EMMs and ECMs, which include the encryption keys and an authorization to use them, additional services can be provided by the gateway 30 with the saved bandwidth, or reduced performance hardware can be used to implement the gateway 30. There is also the added benefit of allowing service providers to extend their entitlement control and management down to the client device.

Figure 3:
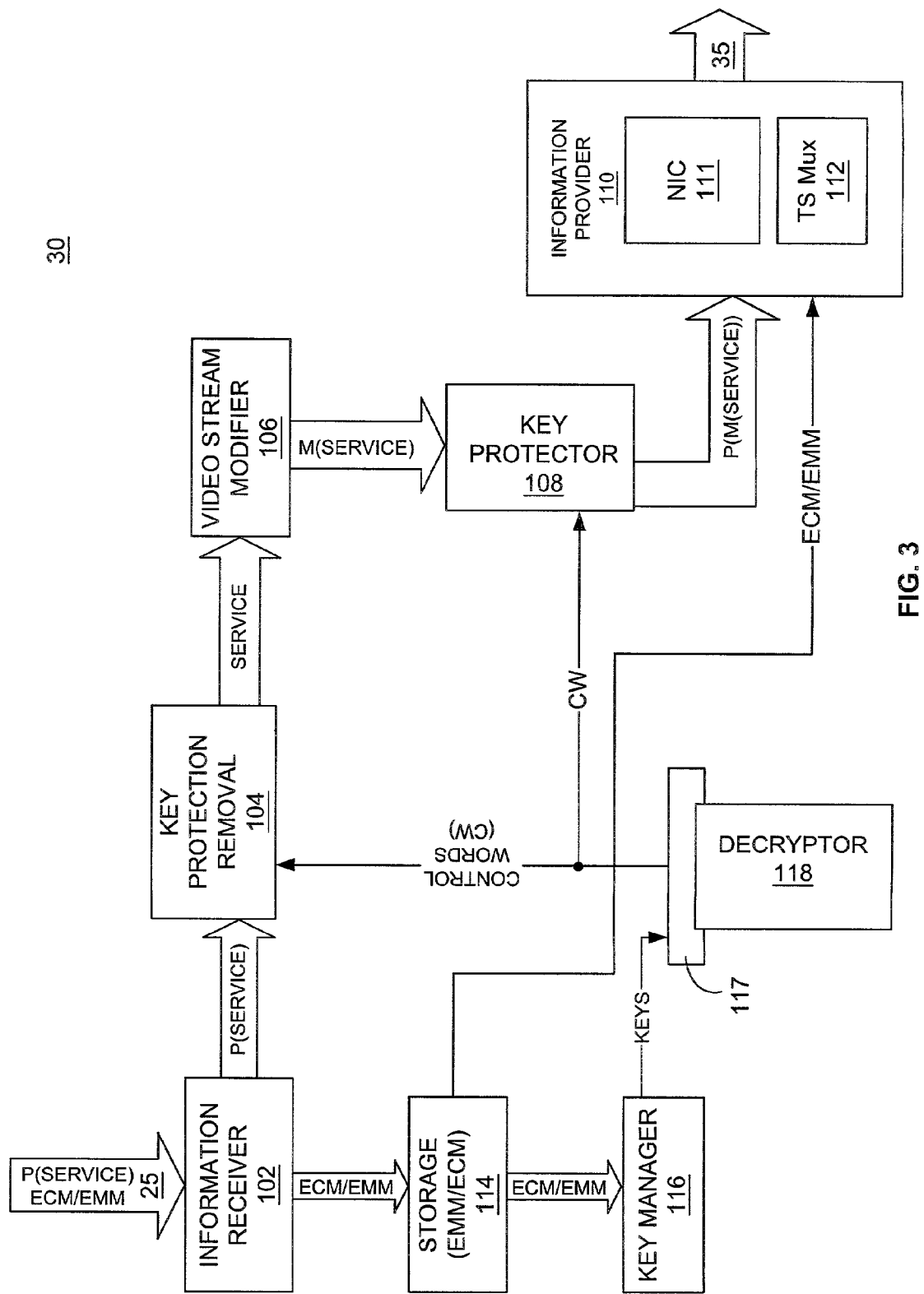
FIG. 3 is a block diagram illustrating a portion of the system of FIG. 1 in greater detail.

In one embodiment the functionality of gateway of FIG. 2 is substantially implemented using a monolithic semiconductor device. Such a monolithic semiconductor device can include any one of a variety of monolithic semiconductor chips or circuits, such as an integrated circuit (IC), an application specific integrated circuit (ASIC), a dual-inline package (DIP), a microprocessor, and the like. For example, in at least one embodiment, monolithic semiconductor device 100 can be implemented as an ASIC that is used to de-scramble scrabbled multimedia content for a motion pictures experts group (MPEG) decoder. Monolithic semiconductor devices can be formed on a silicon substrate, a gallium arsenide substrate, or using any other semiconductor fabrication technology. FIG. 3 illustrates in block diagram form a more detailed view of the gateway 30.

The gateway embodiment illustrated in FIG. 3, includes information receiver 102, key protection removal portion 104, video stream modifier 106, data protector 108, storage location 114, key manager 116, decryptor interface connector 117, decryptor 118 and information provider 110.

Information receiver 102 is coupled to storage location 114 to provide encryption key information, and to the key protection removal portion 104 to provide key protected video data. The storage location 114 is coupled to the key manager 116 and to the information provider 110. The key manager 116 is coupled to a decryptor interface connector 117 to provide encryption key information to a decryptor 118, which is coupled to the decryptor interface connector 117. The decryptor interface connector 117 is further coupled to the key protection removal portion 104 and to data protector 108 to provide control word information based upon the encryption key information. The key protection removal portion 104 is coupled to the video stream modifier 106 to provide the unprotected video data (SERVICE). The video stream modifier 106 is coupled to the data protector 108 to provide a modified unprotected video data (P(SERVICE)). The data protector 108 is coupled to the information provider 110 to provide a key protected modified service. The information provider 110 provides the key protected modified service and encryption key information to one or more clients over a connection 35. Operation of the gateway 30 illustrated in FIG. 3 will be discussed in greater detail with reference to the methods of FIGS. 4–6.

Figure 4:
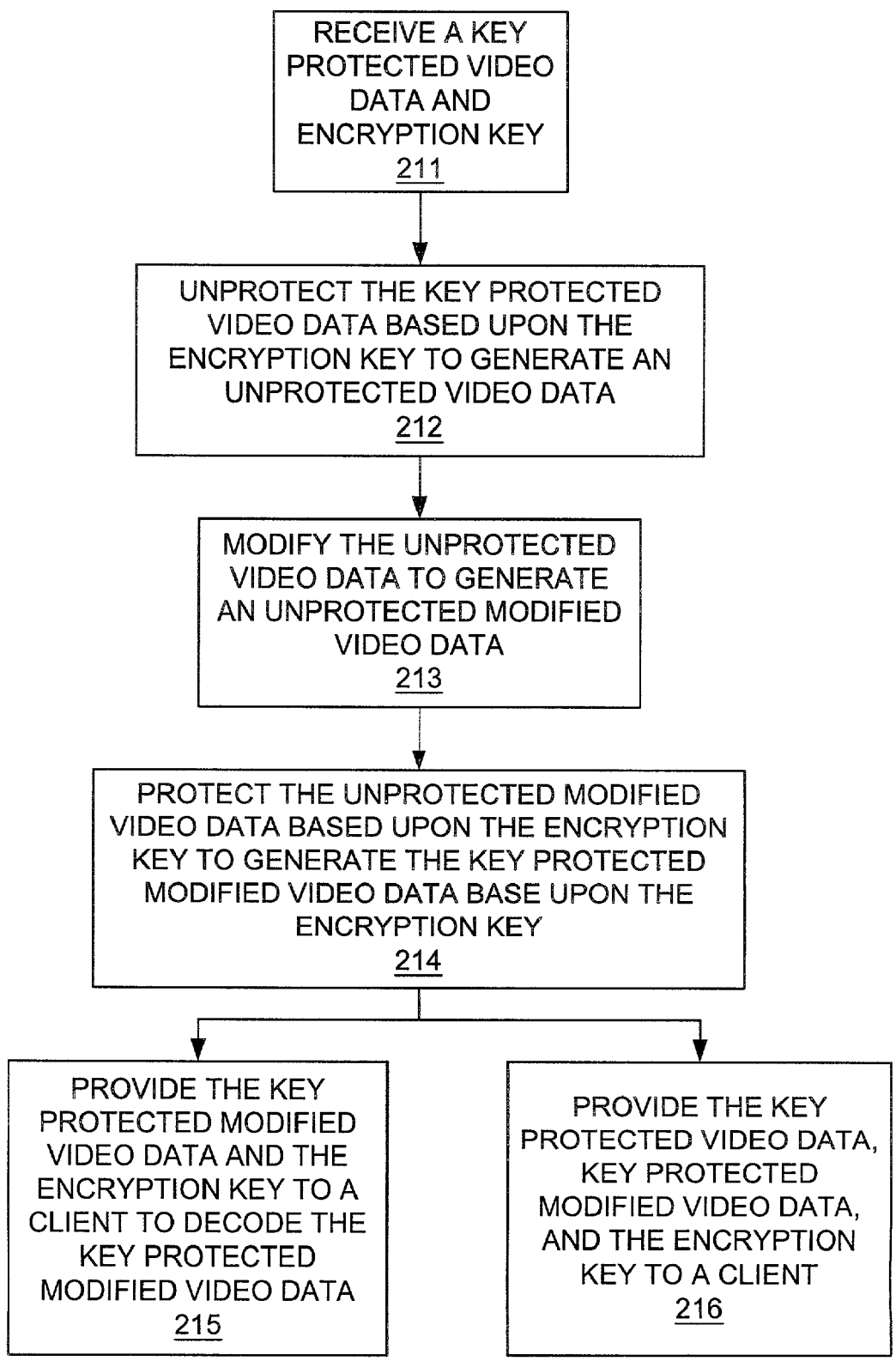
FIG. 4 is a flow diagram illustrating a method of reusing encryption keys in accordance with a specific embodiment of the present disclosure.

FIG. 4 illustrates a flow diagram representing a method in accordance with the present invention. At step 211, a key protected video data and an encryption key are received. With respect to FIG. 3, the information receiver 102 receives key protected video data from a service provider along with encryption key information, such as ECM and EMM information. Typically, the information received at the information receiver 102 will comprise digital information that has been packetized. Examples of such digital information include one or more of transport stream based digital data (QAM/QPSK) and Ethernet based digital data (IP), and other types of data conforming to various standard and/or proprietary protocols can be used.

The information receiver 102 provides the key protected video data to the key protection removal portion 104, and the encryption key information to the storage portion 114. It will be appreciated that the information receiver 102 can provide the key protected video data to the key protection removal portion 104 directly in streaming manner, or it can store the key protected video data in a memory location to support a subsequent access that will provide the key protection portion 104 as needed. Likewise, the information receiver 102 the can store the encryption key information directly into the storage location 114, or buffer the encryption key information for subsequent access.

The encryption key information storage location 114, which in one embodiment includes storage of ECM and EMM information, is coupled to the key manager 114 and to the information provider 110. Storing the EMM/ECM information allows for the their subsequent use as part of the data stream provided over connection 35 to clients 41 through 43 as illustrated in FIG. 1.

Once the key protected video data is received at step 211, the flow of the method of FIG. 4 proceeds to step 212. At step 212 the key protected first video data is decoded based upon the encryption key to generate the unprotected video service (SERVICE). One embodiment of implementing step 212 is further illustrated by the method of FIG. 5, which provides control information, also known as control words (CW), to the key protection removal portion 104.

Figure 5:
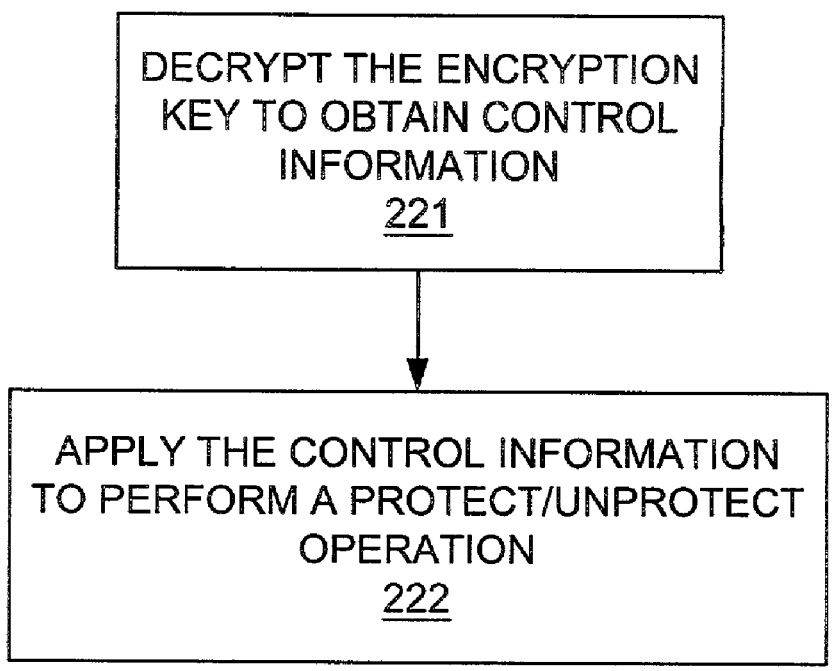
FIG. 5 is a flow diagram illustrating a more detailed method for specific steps of the method of FIG. 4.

Referring to step 221 of FIG. 5 the encryption key is decrypted to obtain a control word. With respect to FIG. 3, this is accomplished by the key manager 116 providing the encryption key information, i.e. the ECM, to the decryptor 118 through the decryptor interface connector 117. Encryption keys periodically change, and it is the responsibility of the key manager 116 to provide the encryption keys to the decryptor 118 in a timely manner to allow to allow decryptor 118 time to generate the control words from the encryption key in time for the key protected video data to be unprotected in a timely manner. Generally, the key manager 116 provides encryption keys to the decryptor 118 as soon as they are available, and the newly generated control words are accessed by the key protection removal portion as they are needed. The decryptor 118 is can be a proprietary decryption device, such as a smart card.

At step 222, the control information is applied to perform a desired protect or unprotect function. With respect to step 212 of FIG. 4, the control word is applied at the key protection removal portion 104 to unprotect the key protected video data. In one embodiment, the key protection removal portion 104 is a video reconstruction portion that reconstructs protected video data from its key protected form and can be referred to as a video construction portion. Typically, the key protected video data is scrambled using orthogonal operations based upon the control word, and de-scrambled using the control word to implement an inverse set of orthogonal operations. In other embodiments, the key protected video data can be encrypted, whereby the key protection removal portion 104 will need to use the control word to decrypt the key protected video data.

At step 213 (FIG. 4), the unprotected video data is modified to generate a second or modified unprotected video data. For example, referring to FIG. 3, the video data (SERVICE) is received at the video stream modifier 106, which provides the modified video data M(SERVICE), which is also unprotected. The modified video data can differ from the unprotected video data in any of a number of manners. For example: the modified video data can be transcoded and/or transrated with respect to the video data; have a different resolution than the unprotected video data; have a different transport protocol, such as from MPEG2 TO MPEG4; have a different bit rate; have a different frame rate; have a bitmap overlay, be watermarked, or otherwise altered in any way from the unprotected video data.

At step 214 (FIG. 4) the modified data is protected based upon the encryption key received at step 211 to generate a key protected modified data. With reference to FIG. 3, the control words generated based on the encryption key are provided to the data protector 108, which acts as a video protection portion to provide the key protected modified data P(M(SERVICE)). Typically, the data protector 108 is a scrambler that modifies the modified data through the use of an orthogonal logic algorithm, although it will be understood that other protection schemes, such as encryption schemes could be used. This is an advantage over previously know methods, in that it is not necessary to determine a new set of control word at the gateway 30.

At step 215, the key protected modified video data and the original encryption key are provided to clients. Alternatively, at step 216, both the key protected modified video data and the received key protected video data are provided to clients. With reference to FIG. 3, the information provider 110 receives the key protected modified data and the encryption key information provides them as part of a digital output stream. Examples of digital output stream information include one or more of transport stream based digital data (QAM/QPSK) using the TS multiplexer (MUX) 112, and Ethernet based digital data (IP) using network interface card 111, though other types of data conforming to various standard and/or proprietary protocols can be used. The information will be responsible for providing the reused key information, for example the ECM/EMM information, in accordance with the protocol being used. Information provider 110 further includes a transmitter 113 which can include a line driver or a wireless transmitter to transmit the digital output stream using a wireless connection or protocol. For example, a wireless Ethernet protocol, such as 802.11 or one of its derivatives (i.e. 802.11b and 802.11a) can be used to transmit the information.

For example, assuming the gateway 30 supports real time operation, with respect to processing the P(SERVICE) to obtain P(M(SERVICE)), the gateway 30 can provide newly received ECM information directly to the clients 41–43. This can be accomplished by transmitting the received ECM packet, without modification, to the clients 41–43 as soon as transport stream bandwidth is available. Even though the new encryption key has been sent, as part of the ECM packet, it will not be used by the clients to unprotect data until the gateway 30 transmits a transport stream that includes a scramble control flag that indicates to the clients 41–43 that the new encryption key is to be used. The switched scramble control flag is sent over the transport stream immediately prior to key protected modified video data that was protected using the new key is sent.

It is possible to reuse the received ECM and EMM packets, thereby eliminating the amount of overhead needed by the gateway 30 to generate and maintain encryption key information. Generally, the EMM and ECMs will be presented to clients in the same order in which they are received. However, it is possible to mix the order, as long as the key manager 116 and information provider 110 operate to assure the encryption key information used to protect data is available at the client before the protected data using that encryption key is sent. Also, it is possible for other information associated with received EMMs and ECMs to be modified before providing them to the clients, however it is generally advantageous to reuse the receive EMMs and ECMs without change. However, where a common protocol is being maintained, it will generally be advantageous to maintain the original EMM and ECM packet information.

In another embodiment of the present invention, a different data stream protocol can be used at the input of gateway 30 than at the output of gateway 30. In order to support such protocol conversion the various components, such as the key manager 116 and information provider 110, will need to operate in a coordinated manner that supports the conversion. For example, the encryption key portion of the ECM information may need to be extracted and transported to a client using a different protocol.

The preceding detailed description of the figures, reference has been made to the accompanying drawings which form a part thereof, and to which show by way of illustration specific embodiments in which the invention may be practiced. It will be appreciated that many other varied embodiments that incorporate the teachings herein may be easily constructed by those skilled in the art. For example, when a specific component is said to provide data to another component it will be understood that the function of providing the data need not be actively initiated by the device described as providing the data, but may instead be initiated by another component which retrieves, or otherwise accesses the data, to accomplish the data access. Accordingly, the present disclosure is not intended to be limited to the specific form set forth herein, but on the contrary, it is intended to cover such alternatives, modifications, and equivalents, as can be reasonably included within the spirit and scope of the invention. The preceding detailed description is, therefore, not to be taken in a limiting sense, and the scope of the present disclosure is defined only by the appended claims.

What is claimed is:

1. A method comprising:
receiving a first video stream comprising a key protected first video data and an encryption key;
modifying the first video data to generate a second video data having a lower bit rate than the first video data;
providing a second video stream comprising a key protected second video data and the encryption key, wherein the second video data is different than the first video data; and wherein the key protected first video data and the key protected second video data can be unprotected using the encryption key.

2. The method of claim 1 further comprising:
decoding the key protected first video data based upon the encryption key to obtain the first video data.

3. The method of claim 2 further comprising:
decrypting the encryption key to obtain a control word;
un-protecting the key protected first video data based on the control word to obtain the first video data; and
determining the key protected second video data based on the second video data and the control word.

4. The method of claim 1 further comprising:
providing the first video stream, wherein a client can use the encryption key to decode at least one of the first video stream and the second video stream.

5. The method of claim 1 further comprising:
providing the second video stream using a wireless protocol.

6. The method of claim 1, wherein providing further comprises providing the encryption key in a first packet of information prior to providing the key protected second video data.

7. A system comprising:
an information receiver portion having an input to receive key protected first video information and an encryption key from a content provider, and an output;
a storage portion having an input coupled to the output of the information receiver portion to receive the encryption key, and an output;
an information provider portion having a first input coupled to the output of the storage portion to access the encryption key, an output to provide a key protected second video information to a client, where the key protected second video information includes the encrypted key and wherein the key protected first video information and the key protected second video information can be unprotected using the encryption key;
a video reconstruction portion having a first input coupled to the output of the storage portion to receive a representation of the encryption key, and a second input coupled to the output of the information receiver to receive the key protected first video information, and an output to provide unprotected first video information;
a video stream modifier having a first input coupled to the output of the video reconstruction module to receive the unprotected first video information, and an output to provide a second video information that is different than the first video information; and
a video protection portion having a first input coupled to the output of the storage portion to receive the representation of the encryption key, and an output to provide the key protected second video information.

8. The system of claim 7, wherein the video reconstruction portion comprises a video descrambler.

9. The system of claim 8, wherein the video protection portion comprises a video scrambler.

10. The system of claim 7, wherein the video reconstruction portion comprises a key decryptor.

11. A method comprising:
receiving a first video stream comprising a key protected first video data and an encryption key;
modifying the first video data to generate a second video data having a lower resolution than the first video data;
providing a second video stream comprising a key protected second video data and the encryption key, wherein the second video data is different than the first video data; and
wherein the key protected first video data and the key protected second video data can be unprotected using the encryption key.

* * * * *